F. F. LEVY.
CAN TOPPING MACHINE.
APPLICATION FILED JUNE 17, 1914.

1,159,848.

Patented Nov. 9, 1915.

WITNESSES:
F. C. Fliedner
G. M. Ball

INVENTOR
Felix F. Levy

BY
Francis M. Wright,
ATTORNEY

UNITED STATES PATENT OFFICE.

FELIX F. LEVY, OF SAN FRANCISCO, CALIFORNIA.

CAN-TOPPING MACHINE.

1,159,848. Specification of Letters Patent. Patented Nov. 9, 1915.

Application filed June 17, 1914. Serial No. 845,619.

*To all whom it may concern:*

Be it known that I, FELIX F. LEVY, a citizen of the United States, residing at San Francisco, in the county of San Francisco and State of California, have invented new and useful Improvements in Can-Topping Machines, of which the following is a specification.

The present invention relates to improvements in machines for automatically topping cans.

The object of the invention is to provide a machine of this character which will be simple in construction, and effective and certain in operation.

Figure 1:
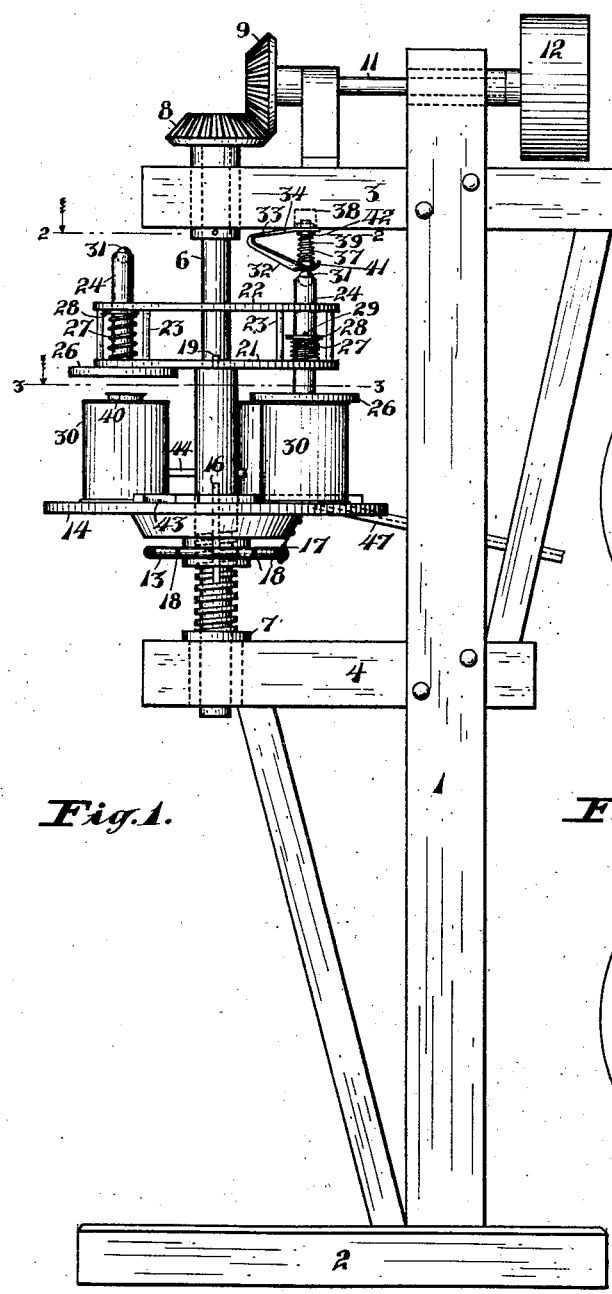
Figure 2:
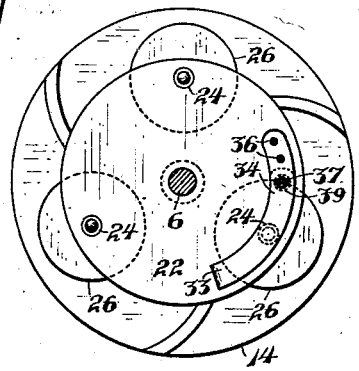
Figure 3:
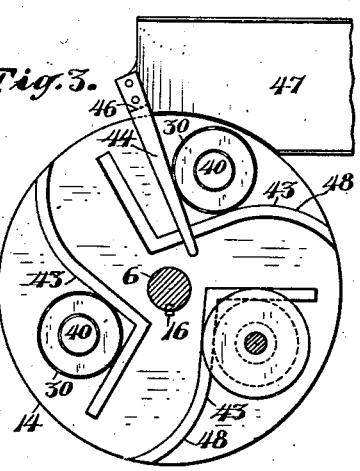

In the accompanying drawing, Figure 1 is a side view of the machine; Fig. 2 is a horizontal section on the line 2—2 of Fig. 1; Fig. 3 is a horizontal section on the line 3—3 of Fig. 1.

Referring to the drawing, 1 indicates a post supported upon a base 2. Secured to, and extending horizontally from, said post are upper and lower brackets 3, 4, in bearings in which can rotate a vertical shaft 6, of which the lower part is enlarged and has secured thereon a collar 7, resting upon the bracket 4, and the upper part is reduced and is secured to a bevel gear 8, meshing with a bevel gear 9 on a horizontal shaft 11, carrying a pulley 12 adapted to be rotated from any suitable source of power. Above the collar 7 the shaft 6 is threaded and there is screwed thereon a hand wheel 13, which supports, adjustably as to height, a table 14, which is keyed, as shown at 16, to the shaft so as to rotate therewith while slidable thereon. The hand wheel is retained in its raised position by a spring latch 17 secured to the table which can engage any one of a circular series of notches 18 in the periphery of the hand wheel. Keyed to the reduced upper portion of the shaft, as shown at 19, is a lower bearing piece 21 secured to an upper bearing piece 22 by studs 23 therebetween. Through said bearing pieces extending vertically are the stems 24 of topping disks 26, said disks being normally raised, so that they engage the under side of the lower bearing piece 21, by coiled springs 27 compressed between said lower piece 21 and collars 28 secured on said stems by pins 29. In the upper ends of said stems are spherical sockets for balls 31, which, in the rotation of the bearing pieces, are adapted to be brought into contact with the under side of the lower member 32 of a bent flat spring 33, of which the upper member 34 is secured by bolts 36 to the upper bracket 3. Both said upper and said lower members are circularly curved about the axis of the shaft as center. To the lower member 32 is connected the lower end of a stem 37, which passes through a hole in the upper member 34 and is threaded above said hole and carries a nut on said threaded end, the bracket 3 having a socket 38 to receive said nut and threaded end. A strong spring 39 is coiled around the stem 37, and is confined between collars 41, 42, abutting against the lower and upper members respectively. In the rotation of the bearing pieces, the lower member 32 pressing against a ball 31 depresses the corresponding stem and topping disk. The cans 30 with the tops 40 thereon are fed, either by hand or by suitable mechanism, on to said table, and are arrested thereon by a pair of low walls or ledges 43 at right angles to each other of which there are as many pairs as there are topping disks, said walls being so arranged that the cans, when arrested thereby, are immediately under the several topping disks carried by the lower bearing piece. Each can with the top thereon revolves with the rotation of the bearing pieces, and, as it so revolves, the ball 31 impinges against the under side of the lower member 32 of the spring 33, and then the disk 26 is depressed against the action of the spring 27 on to the can top, forcing the can top into the hole therefor in the top of the can, until the disk 26 contacts with the raised upper edge of the can, at which time the can top is forced to the required distance into the top of the can. The hand wheel 13 enables the machine to be used with cans of various heights, but, if an individual can should be higher than the can of normal height for which the machine has been adjusted, the strong coiled spring 39 will yield slightly and prevent the can being crushed by the lower member 32 of the flat spring. The ball 31 now passes an upward terminal bend in said lower member 32 and immediately the stem rises under the action of the coiled spring 27, withdrawing the disk 26 from the can top. The can with the can top thereon continues to revolve with the rotation of the table, and impinges against the arm 44 secured to a suitable support 46 adjacent to the edge of the table, and extending inwardly over said table. Its revoluble

I claim:—

1. In a can topping machine, the combination of a rotatable table for carrying cans, plungers for pressing can covers into place, a guide for said plungers, rotating with said table, and a flexible cam for pressing said plungers toward said cans.

2. In a can topping machine, the combination of a vertical shaft, a table secured thereto, bearing pieces secured on said shaft and having bearings therethrough alining vertically with the centers of the cans, vertical stems passing through said bearings, the upper ends of said stems having sockets, disks secured on their lower ends, springs coiled around the stems, balls in said sockets, a spring metal plate curved circularly about the axis of the stem as center, means for securing the upper end of said plate, said balls being adapted to impinge against said plate in the rotation of the bearing pieces, and means for rotating said shaft.

3. In a can topping machine, the combination of a vertical shaft, a table secured thereto, pairs of walls on said table against which the can can abut, upper and lower bearing pieces rigidly connected together and secured on said shaft and having bearings therethrough alining vertically with the centers of the cans when abutting against said pairs of walls, vertical stems passing through said bearings and having projections between the bearing pieces, the upper ends of said stems having sockets, disks secured on their lower ends, spring coiled around the stems between the lower bearing piece and the projections on the stems, balls in said sockets, a spring metal plate curved circularly about the axis of the stem as center, means for securing the upper end of said plate, a spring for pressing downward the lower portion of said plate, said balls being adapted to impinge against said plate in the rotation of the bearing pieces, and means for rotating said shaft.

In testimony whereof I have hereunto set my hand in the presence of two subscribing witnesses.

FELIX F. LEVY.

Witnesses:
 FRANCIS M. WRIGHT,
 D. B. RICHARDS.

movement with the table is arrested by said arm, and, by means of a curved cam-like extension 48 of one of the walls 43, it is pushed off the table and on to a can chute 47.